Jan. 14, 1964 M. C. HIX 3,117,903
JOINING THERMOPLASTIC PIPE
Filed Feb. 11, 1960

INVENTOR.
M.C. HIX

BY *Hudson & Young*

ATTORNEYS

This invention relates to a method of joining thermoplastic pipe. In another aspect it relates to a method of butt welding the ends of pipe made from an olefin polymer such as polyethylene or polypropylene.

United States Patent Office 3,117,903
Patented Jan. 14, 1964

3,117,903
JOINING THERMOPLASTIC PIPE
Marvin C. Hix, Cactus, Tex., assignor to Phillips Petroleum Company, a corporation of Delaware
Filed Feb. 11, 1960, Ser. No. 8,048
13 Claims. (Cl. 156—158)

This invention relates to a method of joining thermoplastic pipe. In another aspect it relates to a method of butt welding the ends of pipe made from an olefin polymer such as polyethylene or polypropylene.

Pipe made from solid polymers of olefins has many uses because of its inert character, being highly resistant to soil acids and other corrosive chemicals. Small diameter pipe can be used as electrical conduit, product chutes, water pipe or pipe for conveying corrosive gases or liquid chemicals. Such pipe is especially useful in underground applications. Several techniques are available for butt welding thermoplastic pipe of this type. Most of these methods involve softening the ends of the pipe sections and then forcing the ends of the pipe together until the polymer fuses. A common disadvantage of several of these techniques is that a ridge forms within the pipe at the point of weld as a result of the molten polymer being forced from between the ends of the pipe. These ridges may cause a pressure drop in fluids being conveyed in the pipe. Frequently it is necessary to ream out these ridges in order to avoid an accumulation of material in the pipe.

I have discovered that pipe formed from solid polymers of olefins can be butt welded without forming the troublesome inside ridge at the point of weld. The welding technique of my invention involves the use of an inert high boiling organic liquid which is heated above the softening temperature of the polymer forming the pipe. The ends of the pipe to be welded are then immersed in the hot bath of organic liquid for a time sufficient to bring the temperature of the submerged polymer to the approximate temperature of the bath. As a result of being so heated the ends of the pipe will expand and flare outwardly so that when the pipe is withdrawn from the bath and the ends butted together, the polymer in the two sections of pipe fuses together without forming the troublesome inside ridge. The temperature of the bath must be sufficient to heat the polymer to a fusible condition and the pipes are held in the bath until the submerged ends become visibly flared. Preferably, the bath is heated to about 60° F. above the softening temperature of the polymer.

It is an object of my invention to provide an improved method of joining thermoplastic pipe. Another object is to provide a method of butt welding the ends of pipe sections formed from olefin polymer. It is a further object of my invention to provide a method of welding pipe sections together without the formation of a ridge inside the pipe at the point of weld. Still another object is to provide a method of welding polyolefin pipe with a minimum of oxidation. Other objects, advantages and features of my invention will be apparent to those skilled in the art from the following discussion and drawing in which:

The process of joining pipe sections according to my invention can be advantageously applied to all pipe which is formed from normally solid polymers of olefins such as ethylene, propylene, 1-butene, and the like. Normally solid olefin polymers can be prepared from a number of processes. That described by the patent to Hogan et al. 2,825,721 is preferred. Other methods such as the high pressure process for polymerizing ethylene of Fawcet et al. 2,153,553 and low pressure processes employing organo metallic systems such as described in the patent to Reynolds et al. 2,886,561 can also be used. Broadly olefin polymers which are most suitable are the normally solid polymers of mono-1-olefins having from 2 to 8 carbon atoms per molecule and no chain branching nearer the double bond than the 4-position. The polymers which are preferred for the practice of my invention are polyethylene, polypropylene, and copolymers of ethylene with propylene or 1-butene.

Ordinarily the size of the pipe or conduit which is to be joined by my invention should not exceed 2 inches in diameter unless a flaring tool is to be used. The thickness of the pipe wall normally does not exceed ¼ inch but wall thicknesses up to ½ inch can be welded by using a flaring tool. It is recommended that my welding technique be used to weld pipe ranging in diameter from ½ to 2 inches, either schedule 40 or 80 wall thickness (approximately 1/10 to ¼ inch thickness).

The heating medium is preferably glycerine which serves both to heat the polymer to its fusion temperature and also serves as a fluxing agent to clean the polymer surface and prevent oxidation after the hot ends of the pipe are withdrawn from the bath. Other heating media can be used, however, and broadly the invention can be practiced with any high boiling organic liqiud which is inert to the polymer of the pipe. Preferably the organic liquids have a boiling point and open cup flash point above 300° F. Such high boiling fluxing agents have little or no tendency to dissolve or swell the polymer.

Examples of a number of suitable organic liquids which can be employed as a heating medium in my invention are heavy vegetable oils such as castor oil, coconut oil, corn oil, cotton seed oil, linseed oil, palm oil, olive oil, peanut oil and the like; animal oils such as lanolin and lard oil; mineral oils such as lubricating oils having an open cup flash point above 300° F., for example motor oil, light machine oil and cylinder oil; paraffin wax and other miscellaneous organic liquids such as the fatty acids, triethanolamine, triethylene glycol, n-butyl stearate and the like.

Figure 1:
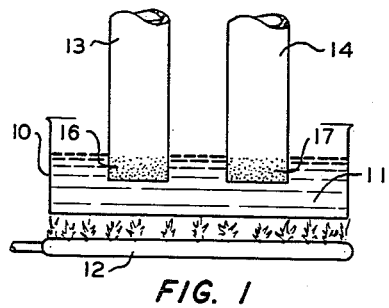
FIGURES 1, 2 and 3 show schematically the steps of heating the pipe ends in a hot bath of organic liquid and butting the pipe ends together until the polymer fuses.

The steps followed in the technique of my invention can best be described by referring to the drawing. FIGURE 1 shows a container 10 which holds a bath of inert organic liquid 11, such as glycerine. The glycerine is heated to at least 60° F. above the softening temperature of the polymer in the pipe to be joined. The heat source is shown in FIGURE 1 as a gas burner 12 although any suitable heat source could be used. Two sections of pipe 13 and 14 are shown with their ends 16 and 17 immersed into the hot bath of glycerine. Generally small diameter pipe of olefin polymer is sufficiently flexible that the pipe can be bent to permit the end of the pipe to be easily immersed in an open container of hot glycerine. The ends of the pipe should first be cleaned of foreign material and shreds.

Figure 2:
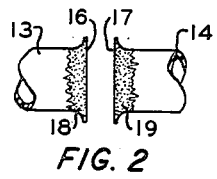

The depth to which the pipe is immersed is generally about twice the wall thickness of the pipe. For pipe having a diameter less than 2 inches and a wall thickness of ⅛ to ¼ inch an immersion depth of about ⅜ inch will be satisfactory. The proper immersion depth can readily be determined in each situation by two or three trials. It is desirable to heat more of the polymer than will take part in the actual fusion or joint of the pipe sections in order to effect the outward expansion or flaring of the pipe. This expansion or flaring is illustrated in FIGURE 2 which shows the ends of pipe sections 13 and 14 after they have been removed from the glycerine bath and placed in position ready to be butted together. As shown in FIGURE 2 the ends 16 and 17 of pipe sections 13 and 14, respectively, will be slightly but visibly flared. The pipe ends will also carry a thin coating of glycerine 18 and 19 which serves to prevent oxidation of the heated polymer.

Figure 3:
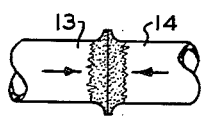
Figure 4:
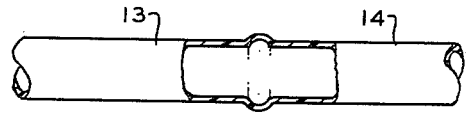
FIGURE 4 shows the completed weld with the absence of the inside ridge at the point of weld.

The ends of pipe sections 13 and 14 are then butted together with force being applied in the direction of the arrows as shown in FIGURE 3. The ends of the pipe will flare out further as pressure is exerted and thus prevent the softened polymer from forming an inside ridge. The pressure applied to the pipe sections will express excess glycerine from the joint. The cross section of the finished weld is shown in FIGURE 4.

Figure 5:
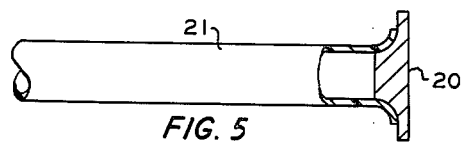
FIGURE 5 shows an alternate embodiment in which a special tool can be used to increase the amount of flare at the ends of the pipe sections.

In working with pipe of larger size than 2 inches in diameter or a wall thickness greater than 1/4 inch it is frequently desirable to increase the amount of flare in the pipe ends prior to butting them together. In such instances a flaring tool is used as shown in FIGURE 5. The end of the pipe section 21 is first softened by heat and then the flaring tool 20 is forced into the end of the pipe. Flared pipe section 21 is then immersed in a hot organic liquid as previously described to bring it to fusion temperature of the treating bath is therefore from about 60° F. butted together as described in connection with FIGURE 3.

Figure 6:
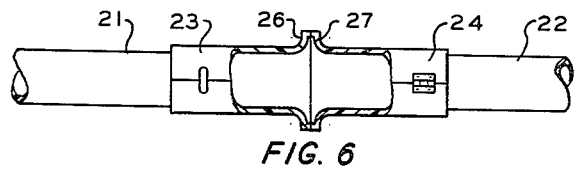
FIGURE 6 shows the use of a forming jig to hold the pipe sections in position during welding.

Alternatively a forming jig can be employed as shown in FIGURE 6. In this embodiment flared pipe section 21 is joined with another flared pipe section 22 after being heated in a glycerine bath to at least 60° F. above the softening temperature of the polymer. The forming jig is made up of two sections 23 and 24 which fit over the outside of the pipe and carry flared ends 26 and 27 shaped to correspond to the flared ends of the pipe sections. The sections of the forming jig are split in half and provided with hinges and fasteners so that the jig can be positioned over the outside of the pipe sections to be welded and removed after the weld has been completed. Jig sections 23 and 24 can be forced together by manual pressure or drawn together and locked in position by mechanical means.

As stated previously the polymer of the pipe should be heated to at least 60° F. above its softening temperature in order to insure that the ends of the pipe are sufficiently flared due to expansion of the polymer and that the ends of the pipe will fuse when butted together. The temperature of the treating bath is therefore from about 60° F. above the softening temperature of the polymer up to the flash point of the heating medium or the decomposition temperature of the polymer, whichever is lower. Generally the temperature of the heating bath is about 300 to 400° F. The preferred temperature when working with pipe formed from high density polyethylene is about 320 to 340° F.

By "high density" polyethylene I refer to polyethylene having a density in the range of 0.940 to 0.990 gram per cubic centimeter at 25° C. Density can be determined by compression molding the polymer at 340° F. until completely molten followed by cooling to 200° F. at a rate of about 10° F. per minute. Water is then circulated through the mold jacket to continue the cooilng to 150° F. at a rate not exceeding 20° F. per minute. The polymer is then removed from the mold and cooled to room temperature.

Density is determined by placing a smooth, void-free pea-sized specimen cut from a compression molded slab of the polymer in a 50-ml., glass-stoppered graduate. Carbon tetrachloride and methyl cyclohexane are added to the graduate from buretes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73–78° F. the balance is adjusted until the pointer is at zero. The value shown on the scale is taken as the specific gravity. With the balance standardized to read 1.000 with a sample of distilled water at 4°C. the specific gravity will be numerically equal to density in grams per cc.

I prefer to use polyethylene having a density determined as above in the range of 0.950 to 0.970 gram per cubic centimeter at 25° C. Generally these polymers have a softening temperature of about 260 to 265° F. Softening temperature as used in this discussion is determined by plotting softness values vs. temperature and the temperature at which the slope of the resulting curve equals 0.0035 softening unit per degree F. is the softening temperature. "Softness" is determined by the method of Karrer, Davis and Dieterich, Industrial and Engineering Chemistry (Analytical Edition), 2, 96 (1930).

The time of immersion in the heating bath can vary from a few seconds, e.g. 15 seconds, up to 5 minutes or more depending upon the temperature of the heating medium, the heat conductivity of the polymer and the thickness of the pipe wall. Generally the period of immersion in the heating bath will be about 1 to 3 minutes.

The following example is given to further illustrate my invention. The conditions are presented as being typical and should not be construed to limit my invention unduly.

*Example*

Two eight-foot sections of 2 inch, schedule 40 pipe formed from polyethylene having a density of 0.960 gram per cubic centimeter at 25° C. and a softening temperature of 262° F. are butt welded by immersing an end of each section in a bath of glycerine at 330° F. The pipe ends are immersed in the hot glycerine to a depth of 3/8 inch and held in the bath for 2 minutes. The pipe ends are visibly flared when they are withdrawn from the bath. The ends are butted together with firm pressure and held in butted relationship until the polymer cools to below its softening point. A strong joint is formed with a small ridge outside the pipe but no ridge inside the pipe.

As will be evident to those skilled in the art, various modifications of this invention can be made, or followed, in the light of the foregoing disclosure and discussion, without departing from the spirit or scope thereof.

I claim:

1. The method of joining two sections of pipe made from thermoplastic normally solid polymer of a monoolefin which comprises immersing one end of each of said pipe sections in a bath of organic liquid at a temperature sufficient to soften said polymer until the submerged ends of said pipes become visibly flared, said liquid being inert to said polymer and having substantially no tendency to dissolve or swell said polymer at said temperature, withdrawing said pipe sections, and butting the heated ends together with pressure until said polymer cools below its softening temperature.

2. The method according to claim 1 wherein said polymer is a polymer of a mono-1-olefin having from 2 to 8 carbon atoms per molecule and no branching nearer the double bond than the 4-position.

3. The method of joining two sections of pipe made from thermoplastic normally solid polymer of a monoolefin polymer which comprises heat softening one end of each of said pipe sections, flaring each of said softened ends by passing same over a flaring tool, immersing the flared end of each of said pipe sections in a bath of organic liquid at a temperature at least about 60° F. above the softening temperature of said polymer until the submerged pipe reaches the approximate temperature of said bath, said liquid being inert to said polymer and having substantially no tendency to dissolve or swell said polymer at said temperature, withdrawing said pipe sections, and butting the heated ends together with pressure until said polymer cools below its softening temperature.

4. The method of claim 3 wherein said pipe sections when butted together are held in butted relationship by a forming jig.

5. The method of claim 4 wherein the polymer is polyethylene and the organic liquid is glycerine.

6. The method of joining two sections of pipe made from thermoplastic olefin polymer selected from the group consisting of polyethylene, polypropylene, ethylene propylene copolymer and ethylene 1-butene copolymer which comprises immersing one end of each of said pipe sections in a bath of organic liquid at a temperature sufficient to soften said polymer until the submerged ends of said pipes become visibly flared, said liquid being inert to said polymer and having substantially no tendency to dissolve or swell said polymer at said temperature, withdrawing said pipe sections, and butting the heated ends together with pressure until said polymer cools below its softening temperature.

7. The method according to claim 6 wherein said organic liquid is a glycerine.

8. The method of claim 7 wherein said polymer is polyethylene.

9. The method of claim 7 wherein said polymer is polypropylene.

10. The method of claim 7 wherein said polymer is a copolymer of ethylene and propylene.

11. The method of claim 7 wherein said polymer is a copolymer of ethylene and 1-butene.

12. The method of claim 6 wherein said polymer is polyethylene having a density in the range of 0.940 to 0.990 gram per cubic centimeter at 25° C. and the temperature of said bath is in the range of about 320 to 340° F.

13. The method of claim 12 wherein the ends of said pipe sections are immersed in said bath for about 1 to 3 minutes.

References Cited in the file of this patent

UNITED STATES PATENTS

| | | |
|---|---|---|
| 2,384,014 | Cutter | Sept. 4, 1945 |
| 2,498,831 | Veitch | Feb. 28, 1950 |
| 2,597,704 | Carlson | May 20, 1952 |
| 2,611,722 | George | Sept. 23, 1952 |
| 2,860,372 | Youthed | Nov. 18, 1958 |

FOREIGN PATENTS

| | | |
|---|---|---|
| 633,201 | Great Britain | Dec. 12, 1949 |
| 137,733 | Sweden | Oct. 21, 1952 |